Feb. 12, 1957 F. X. METZGER 2,781,175
PEELING ATTACHMENT FOR GARBAGE DISPOSAL UNIT
Filed March 1, 1954 2 Sheets-Sheet 1

INVENTOR
FRANK X. METZGER

BY

ATTORNEYS

Feb. 12, 1957 F. X. METZGER 2,781,175
PEELING ATTACHMENT FOR GARBAGE DISPOSAL UNIT
Filed March 1, 1954 2 Sheets-Sheet 2

INVENTOR
FRANK X. METZGER

BY
ATTORNEYS

United States Patent Office 2,781,175
Patented Feb. 12, 1957

2,781,175

PEELING ATTACHMENT FOR GARBAGE DISPOSAL UNIT

Frank X. Metzger, Huntington, Ind.

Application March 1, 1954, Serial No. 413,247

3 Claims. (Cl. 241—101)

This invention relates generally to machines for the removal, by an abrading action, of the skins of potatoes, carrots, turnips and other vegetables and fruits; and it relates more particularly to a machine or apparatus of this character which may be used as an attachment to the present day garbage shredder and disposer units commonly applied to the waste outlets of kitchen sinks.

Such a garbage disposal unit depends from the sink and has a rotary shredding or grinding means driven by an electric motor the circuit of which includes a switch having a movable trip lever or element located adjacent the top of the casing where it is connected to the sink. The switch actuating lever is operated by a cam projection or lug on the rotatable part of a removable cover at the top of the casing and exposed in the waste outlet of the sink. In most makes of such disposal units the grinding rotor is fastened to the top of the motor shaft by a cap screw or bolt.

The principal object of the invention is to provide an effective and practical peeling mechanism which is readily applicable to and removable from the top of the disposal when its cover is removed, which has means for operating the cover-controlled switch and which has a rotary abrading element that is driven by the motor of the disposal unit.

Another object of the invention is to provide a peeler attachment of the above indicated character in which a yieldable driving connection between the abrading element of the peeler and the grinding element of the disposal is automatically effected when the peeler is placed in position for use.

Another object is to provide an accessory or attachment of this character in which the rotary abrading element may be started or stopped by giving the body of the attachment a slight rotary motion relative to the disposal so that the potatoes or the like may be placed on and removed from the abrading element while it is not in motion and while the attachment is conveniently supported in an upright position.

Another object is to provide the attachment with a removable cover which confines the potatoes while they are tumbled about on the rotating abrading element and which has a central opening to receive water from the sink faucet so that the skins will be washed down into the disposal unit and then out to the sewer connection.

With the above and other objects and advantages in view, the invention resides in the novel combinations and arrangements of parts and the novel features of construction hereinafter described and claimed, and illustrated in the accompanying drawings which show the present preferred embodiment of the invention.

Figure 1:
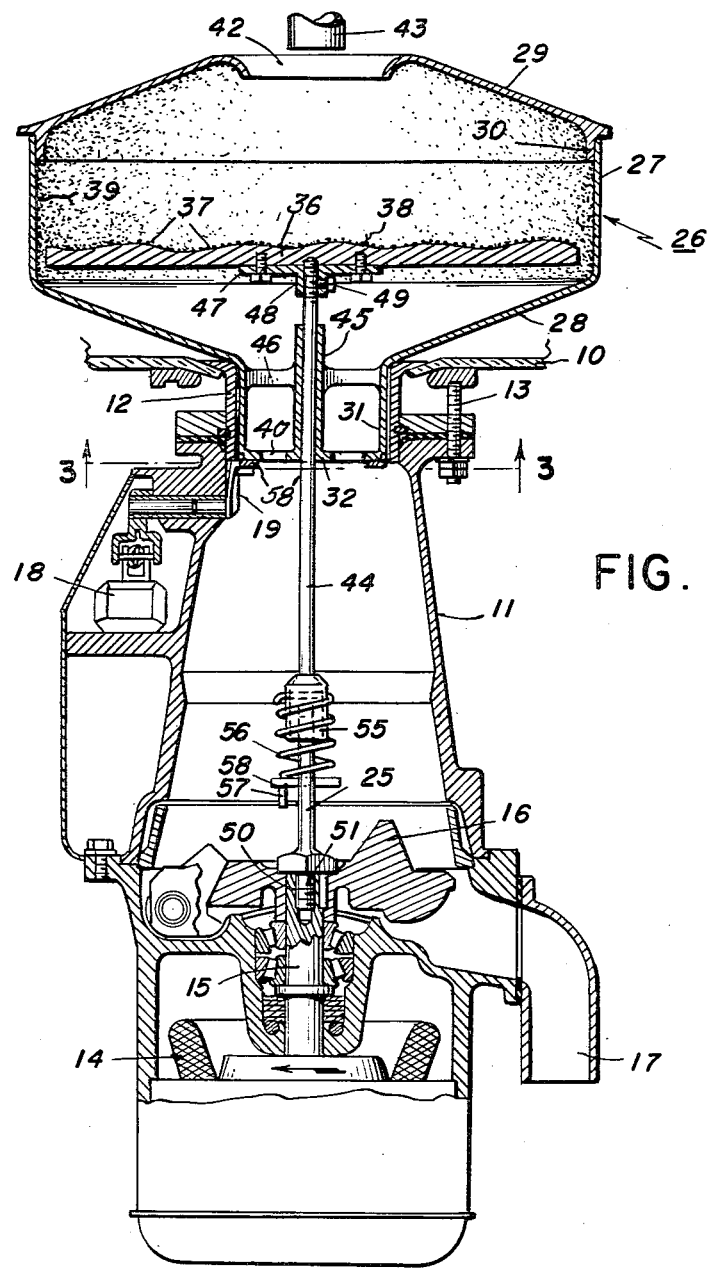
Fig. 1 is a central vertical sectional view through the attachment applied to one well known make of disposal unit in a kitchen sink, the section being taken substantially on the line 1—1 in Fig. 3.
Figure 2:
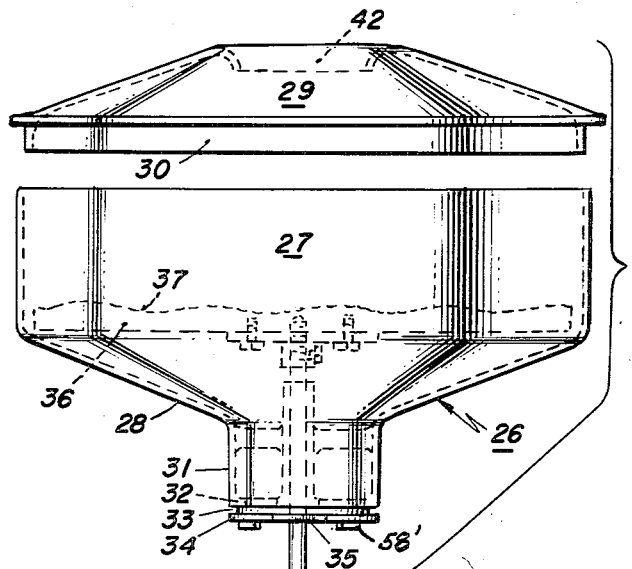
Fig. 2 is an exploded view in side elevation of the several parts of the attachment.

In Fig. 1 the invention is shown applied to a "Westinghouse Waste-Away Garbage Disposer" Model G–4–C Style Y–5387, but it is to be understood that with obvious changes it may be used in connection with various other disposal units.

Figure 3:
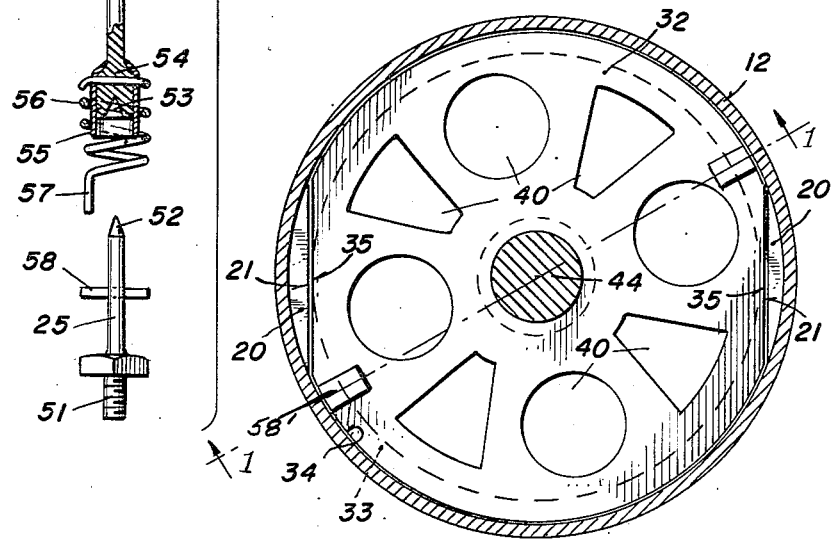
Fig. 3 is an enlarged detail transverse section taken substantially on the line 3—3 in Fig. 1.

The numeral 10 denotes a portion of a kitchen sink or the like at the waste outlet of which is fastened in any manner the casing 11 of the garbage disposal unit. The body or casing 11 has at its top a cylindrical inlet tube 12 which extends into the sink outlet and suitable clamping means 13 fasten these parts together and to the sink so that the casing depends from the latter. At the bottom of the casing is an electric motor 14 with an upright shaft 15 disposed in the axis of the casing and carrying at its upper end a rotary grinding head 16 positioned adjacent a waste outlet 17 which may be connected to the sewer pipe. Mounted on the outside of the casing 11 is a toggle switch 18 arranged in the circuit of the motor 14 and suitably actuated by a trip lever or other movable element 19 within the casing 11 and disposed adjacent the lower end of the tubular sleeve or neck 12. At the flat lower end of the latter there are two inwardly extending projections 20 with flat opposed faces 21, as seen in Fig. 3. These are provided to permit the removable cover (not shown) to be interlocked with the disposal flange or neck 12 and to permit said cover to be properly positioned so that a cam on its rotatable handle portion may be in operative relation to the trip lever 19, the latter being actuated when the handle portion is rotated.

The attachment comprises a primary driving shaft 25 which is to be permanently mounted in the casing 11 so as to be rotated when the grinding head or rotor 16 is in operation, and a self contained unit 26 which contains the rotary abrading means driven from the shaft 25 and which may be quickly and easily applied to and removed from the disposal unit. The attachment unit 26 comprises a preferably cylindrical body or receptacle 27 with a funnel-shaped bottom 28 and an open top adapted to be closed by a removable cover 29, the latter having an annular depending flange 30 to telescope into the circular wall 27 with a friction fit. Depending from the center of the inclined or frusto-conical portion of the bottom 28 is a cylindrical tubular neck 31 of a size to slide and rotate in the flange or neck 12 of the disposal. The tubular portion or neck 31 has a suitably thickened bottom wall 32 the periphery of which is formed with an annular groove 33 to provide an annular radial flange 34 at the bottom of the neck. At diametrically opposite points the flange 34 is cut away to form flat areas 35. These cutaway portions or flats 35 correspond to the flat faced flanges 20 in the neck 12, as seen in Fig. 3. The length of the neck 31 is such that when it is dropped into the neck 12 and the flats 35 are in line with the flat edges 21 of the flanges or projections 20, the flared bottom 28 will engage the top of the neck 12 and dispose the flanges 20 in neck 12 opposite the groove 33. When the parts are thus positioned the body or receptacle may be slightly rotated about its axis to position the flanges 20 in the groove 33 to interlock the two necks.

Within the receptacle body 26 is a rotary abrading element 36. It may form a false bottom upon which the potatoes are placed and is shown as a circular body or plate having a diameter slightly less than the interior diameter of the wall 27. The top of the abrading and agitating member 36 is of undulating or irregular shape, as shown at 37 in Fig. 1, so that as it rotates the potatoes or the like will be bounced about. The face of the irregular surface 37 is covered with an abrasive material 38 or otherwise roughened to cause the potatoes to be skinned or peeled. A similar abrasive surface 39 is provided on the inner face of the upright wall 27; and it may also be provided on the under face of the cover 29. The skins removed by the abrading action pass down around the edge of the member 36 into the funnel shaped bottom and then through suitable openings 40 formed in the bottom wall 32 and into the casing 11. To facilitate the operation water is introduced into the receptacle preferably from the faucet of the sink. Such faucets usually have swingable discharge arms which may be positioned over the center of the cover 29 to discharge water through a central opening 42 therein. The numeral 43 in Fig. 1 represents the discharge end or spout of a water faucet.

The abrading member 36 is removably fixed at the top of a shaft 44 disposed in and axially of the neck 12. It is mounted for rotating and sliding movements in a central bearing sleeve 45 disposed in the neck 31 and supported by a spider 46, and also, if desired, by the bottom plate 32. To permit the abrading member 36 to be replaced if worn out or damaged, there may be fastened to the center of its flat bottom face by screws or bolts a disk 47 with a central boss 48 threaded to receive the threaded upper end of the shaft 44. A set screw 49 may be used in the boss to lock it on the shaft.

If the grinding head 16 is fastened to the motor shaft 15 by a cap screw threaded in a hole 50 at the upper end of the shaft, it is only necessary to replace that screw with a similar one which carries the drive shaft 25, as shown in Fig. 1, but the latter may be fixed in other ways to a rotatable part of the disposal unit. The shaft 25 is shown as having its lower end fixed to a cap screw 51 threaded in the hole 50, and its upper end 52 is pointed or of conical shape to be received in a similar shaped socket 53 formed in an enlargement 54 on the lower end of the shaft 44. This construction insures the alinement of the shafts when the attachment is applied to the disposal. To facilitate the engagement of these parts, the head 54 preferably carries a cylindrical sleeve 55 about which is coiled a driving spring 56. The upper end of this coil spring 56 is fixed; and extending downwardly from the projecting lower end is a resilient arm 57 adapted to engage either end of a cross pin 58 in the shaft 25 to provide the driving connection. The parts are so proportioned that when the attachment is applied to the disposal, the parts 52, 53 will interengage and the arm 57 will be disposed in the path of rotation of the pin 58.

The rotary movement of the neck 31 in the neck 12 is also used to actuate the trip lever 19 of the toggle switch 16. That is accomplished by providing on the lower end of the neck 31 at least one cam projection 58' although two may be used at diametrically opposite points as shown in Fig. 3. These cams 58' are of such size and shape that they are disposed in the horizontal plane of the top of the lever 19 when the sleeve 31 is in its lowest position in the sleeve 12, and hence when the casing 26 is rotated, one or the other of the cams will engage and trip the lever 19 to close or open the switch 18 according to the direction of rotation of the casing. While the operation of the switch 18 may cause the starting and stopping of the motor of the grinding or comminuting means, it is customary to include in the circuit of the motor another switch in series with the switch 18 and controlled by the flow of water from the spout 43, or by other means.

It will be seen that when the primary or drive shaft 25 is applied to the motor shaft or other rotating part of the comminuting mechanism, it is only necessary, in order to use the peeling attachment, to insert the neck 31 in the flange or neck 12 of the disposal and partially rotate it. When that is done the parts 57 and 58 of the drive are automatically engaged so that when the shaft 25 rotates the abrading element 36 will be driven and water from the spout or faucet 43 will be discharged into the casing 26 through the opening in the cover 29. The permanent mounting of the drive shaft 25 on the rotary part of the comminuting mechanism will not interfere with the ordinary use of the disposal unit. After the peeling attachment has been used it is only necessary to lift it out of the disposal. No tools are needed to apply or remove the attachment.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. The combination of a peeling attachment for use in a sink having a waste outlet in its bottom and a water discharge spout above the outlet, with a disposal unit including a tube connected to said outlet, a rotor in alinement with said outlet and tube and driving means for the rotor, said attachment comprising a vegetable receiving receptacle with an opening in its top to receive water from the spout and a reduced depending tubular neck to telescopically fit the inlet tube of the disposal unit and through which water and waste from the receptacle are discharged into the disposal unit, an upright bearing tube fixed in the center of said neck, a rotary shaft extending through said tube and into said receptacle and the disposal unit, a vegetable abrading element in the receptacle fixed to the upper end of said shaft, a driving shaft axially alined with the first mentioned shaft and rotatable with the rotor of the disposal unit, and a detachable driving connection between said shafts.

2. The structure of claim 1 in which said driving shaft is integral with a cap screw which fastens the rotor to its driving means.

3. The structure of claim 1 in which said detachable driving connection comprises an enlargement at the lower end of the first mentioned shaft with a downwardly facing conical socket in its lower end, a cylindrical sleeve surrounding and extending below the enlargement, the upper end of said driving shaft being of conical shape to enter said socket, a cross pin fixed to the driving shaft, and a coil spring fixed to said enlargement and surrounding said sleeve, said spring having a downwardly projecting free end which projects into the path of said cross pin when said neck is disposed in the tube of the disposal unit.

References Cited in the file of this patent

UNITED STATES PATENTS

| | | |
|---|---|---|
| 2,156,075 | Alexay | Apr. 25, 1939 |
| 2,560,578 | Keene | July 17, 1951 |
| 2,675,968 | Dunbar | Apr. 20, 1954 |